(12) United States Patent
Zhao et al.

(10) Patent No.: US 9,247,473 B2
(45) Date of Patent: Jan. 26, 2016

(54) MOTION BASED HANDOFF CONTROL

(75) Inventors: Wen Zhao, Cupertino, CA (US); Jerome Tu, Saratoga, CA (US); Isabel Mahe, Los Altos, CA (US); Jianxiong Shi, Pleasanton, CA (US); Olivier Boireau, Los Altos, CA (US); Alexander Fertelmeister, Cupertino, CA (US); Yury Fomin, Pleasanton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 612 days.

(21) Appl. No.: 11/555,245

(22) Filed: Oct. 31, 2006

(65) Prior Publication Data

US 2008/0102835 A1 May 1, 2008

(51) Int. Cl.
*H04W 36/00* (2009.01)
*H04W 36/32* (2009.01)

(52) U.S. Cl.
CPC .................................... *H04W 36/32* (2013.01)

(58) Field of Classification Search
CPC ..... H04W 36/32; H04W 36/08; H04W 36/14; H04W 36/24
USPC ........... 455/437, 435.1, 403, 404.2, 436, 442, 455/456.1; 370/310, 331, 332, 338; 713/171
See application file for complete search history.

(56) References Cited

U.S. PATENT DOCUMENTS

| | | | |
|---|---|---|---|
| 6,141,565 A * | 10/2000 | Feuerstein et al. | 455/560 |
| 6,529,850 B2 | 3/2003 | Wilborn et al. | |
| 6,584,331 B2 * | 6/2003 | Ranta | 455/574 |
| 7,116,957 B2 | 10/2006 | Sih et al. | |
| 7,263,349 B2 | 8/2007 | Sih et al. | |
| 7,769,378 B2 * | 8/2010 | Dorenbosch et al. | 455/435.1 |
| 2001/0006514 A1 * | 7/2001 | Park | 370/331 |
| 2002/0138229 A1 | 9/2002 | Wilborn et al. | |
| 2002/0147024 A1 * | 10/2002 | Wan | 455/515 |
| 2003/0036374 A1 * | 2/2003 | English et al. | 455/403 |
| 2003/0176201 A1 | 9/2003 | Sih et al. | |
| 2003/0176203 A1 | 9/2003 | Sih et al. | |
| 2004/0097234 A1 * | 5/2004 | Rajkotia et al. | 455/442 |
| 2004/0121774 A1 * | 6/2004 | Rajkotia et al. | 455/441 |
| 2005/0020219 A1 | 1/2005 | Sih et al. | |
| 2005/0026625 A1 * | 2/2005 | Gehlot et al. | 455/456.1 |

(Continued)

OTHER PUBLICATIONS

U.S. Appl. No. 60/750,737, Yaqub, filed Sep. 14, 2005.*

(Continued)

*Primary Examiner* — Amancio Gonzalez
(74) *Attorney, Agent, or Firm* — Norton Rose Fulbright US LLP

(57) ABSTRACT

Motion-based handoff control techniques are disclosed. For example, an apparatus may include a signal strength determination module, a motion determination module, and a handoff controller. The signal strength determination module generates signal strength information corresponding to the strength of a wireless signal received from a first wireless link. From this information, the motion determination module determines a motion characteristic of the apparatus. Based on the motion characteristic, the handoff controller performs handoff operations for a second wireless link. In this manner, handoff operations may be tailored to the operational characteristics of the apparatus. For instance, certain handoff operations may be halted when the motion characteristic indicates the apparatus having a substantially stationary position. Other embodiments are described and claimed.

24 Claims, 10 Drawing Sheets

(56) References Cited

U.S. PATENT DOCUMENTS

| | | | |
|---|---|---|---|
| 2005/0226185 A1* | 10/2005 | Tell | H04W 36/18 370/331 |
| 2005/0271014 A1* | 12/2005 | Gillies et al. | 370/331 |
| 2006/0199608 A1* | 9/2006 | Dunn et al. | 455/552.1 |
| 2007/0140256 A1* | 6/2007 | Yaqub | 370/395.5 |
| 2008/0184032 A1* | 7/2008 | Li et al. | 713/171 |

OTHER PUBLICATIONS

Kim, Dongwoo, "Improving Idle Handoff in CDMA Mobile Systems", IEEE Communications Letters, vol. 2, No. 11, pp. 304-306, Nov. 1998.

* cited by examiner

MOTION BASED HANDOFF CONTROL

BACKGROUND

Mobile computing devices, such as smart phones, may provide various processing capabilities. For example, mobile devices may provide personal digital assistant (PDA) features such as word processing, spreadsheets, synchronization of information (e.g., e-mail) a desktop computer, and so forth.

In addition, such devices may have wireless communications capabilities. More particularly, mobile devices may employ various communications technologies to provide features, such as mobile telephony, mobile e-mail access, web browsing, and the reception of content (e.g., video and radio). Examples of such technologies include cellular, satellite, and mobile data networking technologies.

Typically, operational power for such devices is provided by batteries. Therefore, it is desirable to prolong battery life by reducing a mobile device's demand for operational power. This may involve making one or more of its operations more power efficient.

SUMMARY

In one embodiment, a motion determination module determines a motion characteristic of an apparatus based on information associated with one or more received wireless signals. A handoff controller performs handoff operations for a wireless link based on the motion characteristic. Other embodiments are described and claimed.

DETAILED DESCRIPTION

I. Introduction

Various embodiments may be generally directed to motion based handoff control techniques. In one embodiment, for example, an apparatus includes a motion determination module and a handoff controller. The motion determination module determines a motion characteristic of the apparatus based on information associated with one or more received wireless signals. Based on this motion characteristic, the handoff controller performs handoff operations for a wireless link. In this manner, handoff operations may be tailored to the operational characteristics of the apparatus. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

II. Apparatus

Figure 1A:
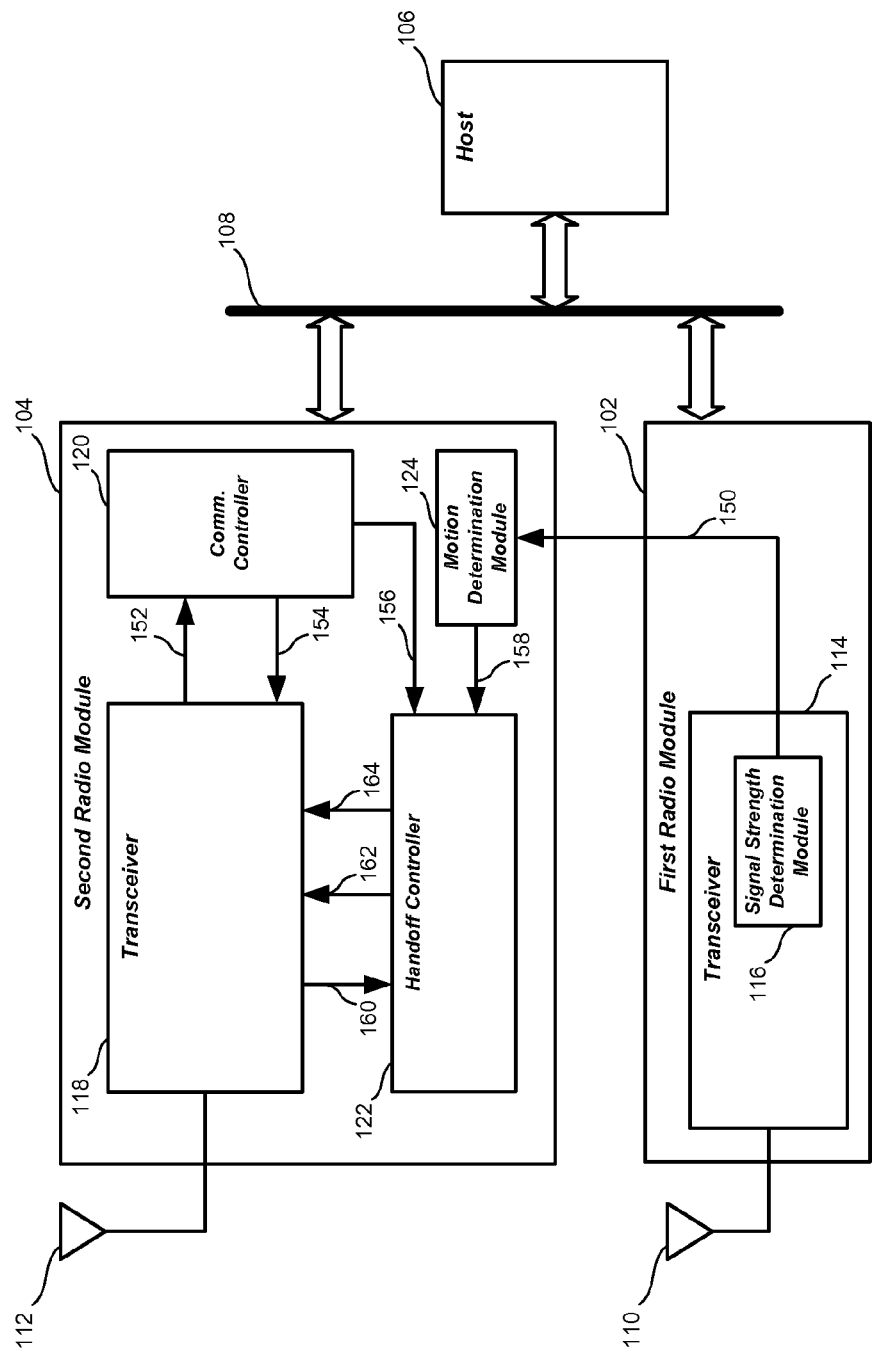
FIGS. 1A, 1B and 1C are diagrams illustrating embodiments of an apparatus.

FIG. 1A illustrates one embodiment of an apparatus that may communicate across different types of wireless links. In particular, FIG. 1A shows an apparatus 100 comprising various elements. The embodiments, however, are not limited to these depicted elements. In particular, FIG. 1A shows that apparatus 100 may include a first radio module 102, a second radio module 104, a host 106, and an interconnection medium 108. These elements may be implemented in hardware, software, firmware, or in any combination thereof.

First radio module 102 and second radio module 104 may communicate with remote devices across different types of wireless links. For example, first radio module 102 may communicate across data networking links. Examples of such data networking links include wireless local area network (WLAN) links, such as IEEE 802.11 WiFi links. Further examples include wireless metropolitan area (WMAN) links, such as IEEE 802.16 WIMAX links, and personal area networks (PAN) links such as Bluetooth links. However, the embodiments are not limited to these examples.

Second radio module 104 may communicate across wireless links provided by one or more cellular systems. Examples of such cellular systems include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Digital Advanced Mobile Phone Service (IS-136/TDMA), Narrowband Advanced Mobile Phone Service (NAMPS) systems, third generation (3G) systems such as Wide-band CDMA (WCDMA), CDMA-2000, Universal Mobile Telephone System (UMTS), cellular radiotelephone systems compliant with the Third-Generation Partnership Project (3GPP), and so forth. However, the embodiments are not limited to these examples. For instance, second radio module 104 may additionally or alternatively communicate across non-cellular communications links.

FIG. 1A shows that first radio module 102 comprises a transceiver 114. Transceiver 114 may (through an antenna 110) exchange wireless signals across one or more wireless links. As described above, these links may include one or more data networking links. However, the embodiments are not limited to such. FIG. 1A further shows that transceiver 114 may include a signal strength determination module 116. This module assesses the strength of wireless signals received by transceiver 114. From such assessments, module 116 generates signal strength information 150, which is sent to second radio module 104. Based on this information, second radio module 104 may adapt its handoff operations.

Signal strength determination module 116 may perform such signal strength assessments through various techniques. One such technique involves performing a correlation operation with a predetermined transmission sequence (such as a portion of a burst transmission). Another technique involves assessing signal strength from low noise amplifier (LNA) settings used in the reception of wireless signals. Further techniques involve the computation of signal strength indicators, signal-to-noise ratios, or carrier-to-noise ratios according to well known measurement techniques. The embodiments, however, are not limited to these examples.

FIG. 1A shows that signal strength determination module 116 generates signal strength information 150, which is sent to second radio module 104. Based on this information, second radio module 104 may determine its handoff operations.

Second radio module 104 may include a transceiver 118, a communications controller 120, a handoff controller 122, and a motion determination module 124. Transceiver 118, in conjunction with an antenna 112, exchanges wireless signals across one or more wireless links. As described above, these links may include (but are not limited to) one or more cellular links.

Communications controller 120 exchanges information with transceiver 118. For instance, FIG. 1A shows communications controller 120 receiving demodulated information 152 from transceiver 118, and sending baseband information 154 to transceiver 118. Both demodulated information 152 and baseband information 154 correspond to wireless signals exchanged by transceiver 118. This information may include payload information as well as additional overhead information. Such overhead information may include identifiers of neighbor cells within communications range.

With respect to the transmission and reception of information via transceiver 118, communications controller 120 may be responsible for operations associated with one or more protocol layers. Such operations may include error correction encoding and decoding, packet encapsulation, timing control (e.g., synchronization with transmission frames and/or pseudo noise (PN) sequences), as well as others. However, the embodiments are not limited to such examples.

As shown in FIG. 1A, motion determination module 124 receives signal strength information 150. From this information, motion determination module 124 generates a corresponding motion characteristic 158, which is sent to handoff controller 122. Motion characteristic 158 provides an indication of movement for apparatus 100. For instance, motion characteristic 158 may indicate whether apparatus 100 is stationary or in motion. Further, motion characteristic 158 may indicate the extent (e.g., velocity) of any such motion.

Such determinations by motion determination module 124 may be based on signal strength variations. This may involve one or more signal strength variation thresholds, and a time window duration. For instance, when motion determination module 124 determines that a variation threshold is exceeded during the time window duration, a motion characteristic 158 is generated. This generated motion characteristic indicates that a corresponding velocity has been exceeded.

In embodiments, motion determination module 124 may employ a single signal strength variation threshold. Accordingly, in such embodiments, motion characteristic may indicate that apparatus 100 either has a substantially stationary position or that apparatus 100 is in motion. However, in further embodiments, multiple signal strength variation thresholds may be established. In such embodiments, each threshold corresponds to a particular velocity or velocity range.

Handoff controller 122 performs handoff operations. These operations may involve monitoring and evaluating candidates for potential handoffs. The candidates may be evaluated based on candidate neighbor data 160 (e.g., signal strength information) and motion characteristic 158. As shown in FIG. 1A, neighbor data 160 may be received from transceiver 118. Also, the candidates may be identified in a neighbor list 156 received from communications controller 120. This list indicates particular remote devices (e.g., remote cellular base stations) for evaluation by handoff controller 122.

FIG. 1A further shows handoff controller 122 sending reception parameters 164 to transceiver 118. Such parameters indicate particular measurements for transceiver 118 to make in generating candidate neighbor data 160.

Host 106 may exchange information with radio modules 102 and 104. As shown in FIG. 1A, such exchanges may occur across interconnection medium 108. For instance, host 106 may send information to these radio modules for wireless transmission. Conversely, radio modules 102 and 104 may send information to host 106 that was received in wireless transmissions. In addition, host 106 may exchange information with radio modules 102 and 104 regarding their configuration and operation. Examples of such information include control directives sent from host 106 to radio modules 102 and 104.

Furthermore, host 106 may perform operations associated with higher layer protocols and applications. For instance, host 106 may provide various user applications, such as telephony, text messaging, e-mail, web browsing, word processing, video signal display, and so forth. In addition, host 106 may provide one or more functional utilities that are available to various protocols, operations, and/or applications. Examples of such utilities include operating systems, device drivers, user interface functionality, and so forth.

Interconnection medium 108 provides for couplings among elements, such as first radio module 102, second radio module 104, and host 106. Thus, interconnection medium 108 may include, for example, one or more bus interfaces. Examples of such interfaces include Universal Serial Bus (USB) interfaces, as well as various computer system bus interfaces. Additionally or alternatively, interconnection medium 108 may include one or more point-to-point connections (e.g., parallel interfaces, serial interfaces, etc.) between various element pairings.

FIG. 1A shows information being exchanged among the elements of apparatus 100. For example, FIG. 1A shows signal strength information 150 being directly sent from module 116 to module 124. However, the embodiments are not so limited. For instance, such information may be routed through one or more intermediate elements. Examples of such elements may include (but are not limited to) interconnection medium 108, host 106, and/or communications controller 120.

As described above, the elements of FIG. 1A may be implemented in hardware, software, firmware, or in any combination thereof. For example, features of these elements (as well as features described below with reference to FIGS. 3, 4, 5, and 6) may be implemented through instructions or logic executed by one or more processors. Accordingly, such processor(s) may be allocated among various elements. The instructions or logic may be stored in various types of storage media, such as memory.

Figure 1B:
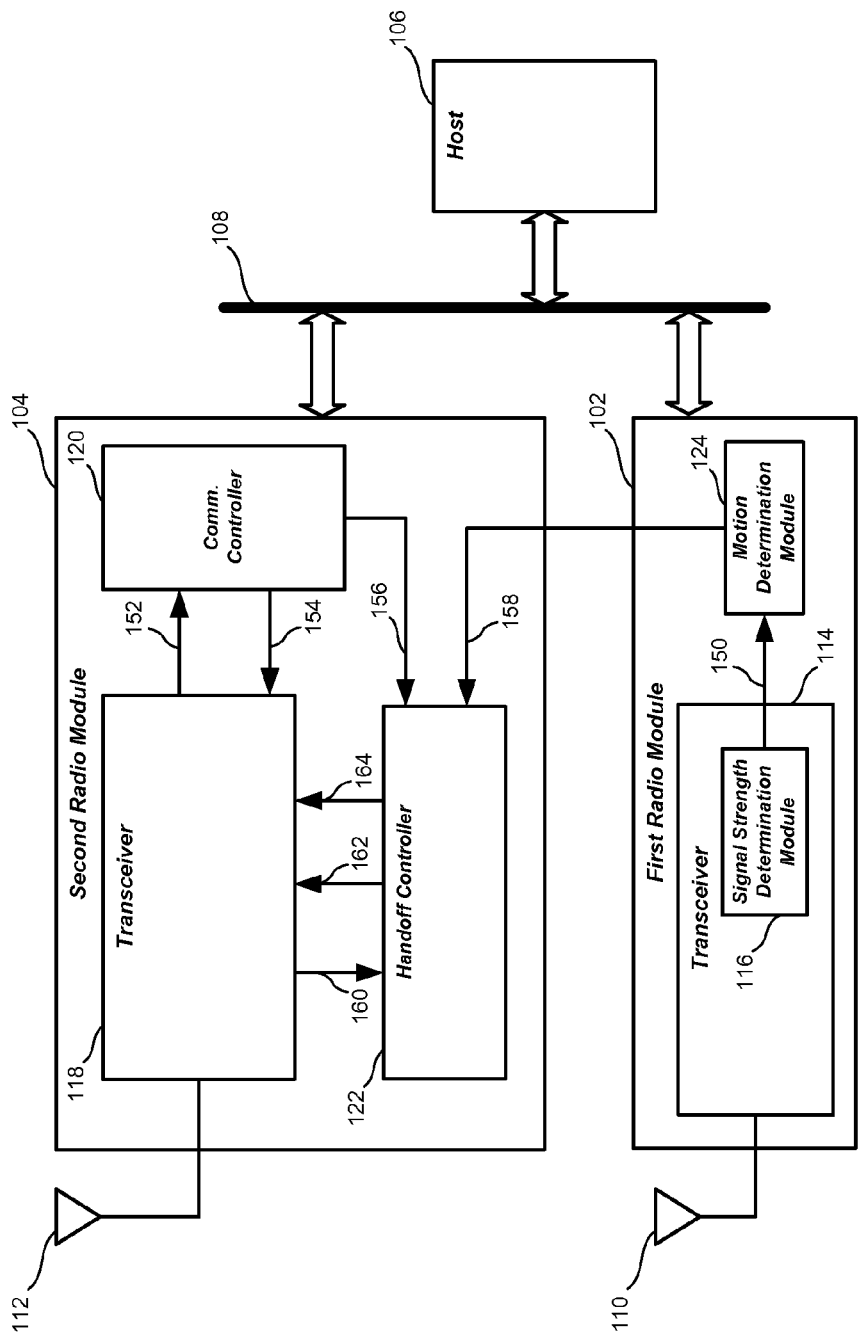

FIG. 1B illustrates a further embodiment of an apparatus that may communicate across different types of wireless links. In particular, FIG. 1B is a diagram of an apparatus 100' that is similar to apparatus 100 of FIG. 1A. However, for apparatus 100', motion determination module 124 is included within first radio module 102 and not second radio module 104. Thus, in apparatus 100', first radio module 102 generates motion characteristic 158 from signal strength information 150. Also, as shown in FIG. 1B, motion characteristic 158 is forwarded from motion determination module 124 within first radio module 102 to handoff controller 122 within second radio module 104.

Figure 1C:
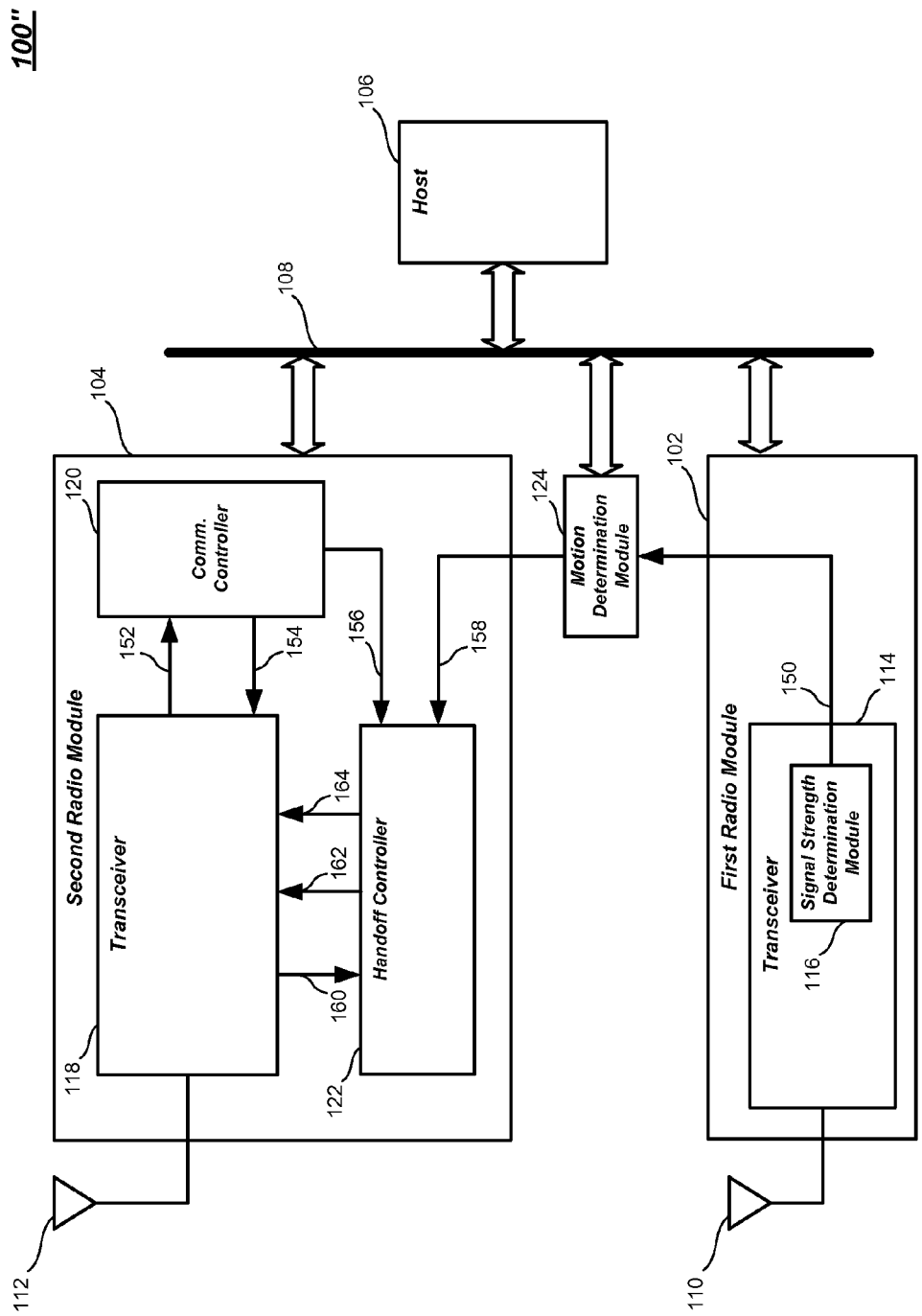

Yet a further embodiment is shown in FIG. 1C. In particular, FIG. 1C is a diagram of an apparatus 100" that is similar to the embodiments of FIGS. 1A and 1B. However, in this embodiment, motion determination module 124 is included neither in first radio module 102 nor second radio module 104. As shown in FIG. 1C, motion determination module 124 may be coupled to interconnection medium 108. This may provide for the transfer of signal strength information 150 and motion characteristic 158 between modules. However, such transfers may also occur through direct couplings. In general operation, apparatus 100 and apparatus 100' may employ radio modules 102 and 104 to communicate across different types of wireless links. These communications may be associated with one or more user applications handled by host 106. For instance, first radio module 102 may provide a first type of wireless communications (e.g., data networking), while second radio module 104 may provide a second type of wireless communications (e.g., cellular telephony).

As described above, radio modules 102 and 104 may exchange information to assist in their operation. For example, in apparatus 100 of FIG. 1A, first radio module 102 may provide second radio module 104 with signal strength information 150. Also, in apparatus 100' of FIG. 1B, first radio module 102 may provide second radio module 104 with motion characteristic 158. Such information may assist second radio module 104 in its handoff operations. For instance, such features may provide second radio module 104 with the capability to determine handoff operations based on motion characteristics of apparatus 100. This may advantageously improve power consumption of apparatus 100.

III. Operational Scenarios

Figure 2A:
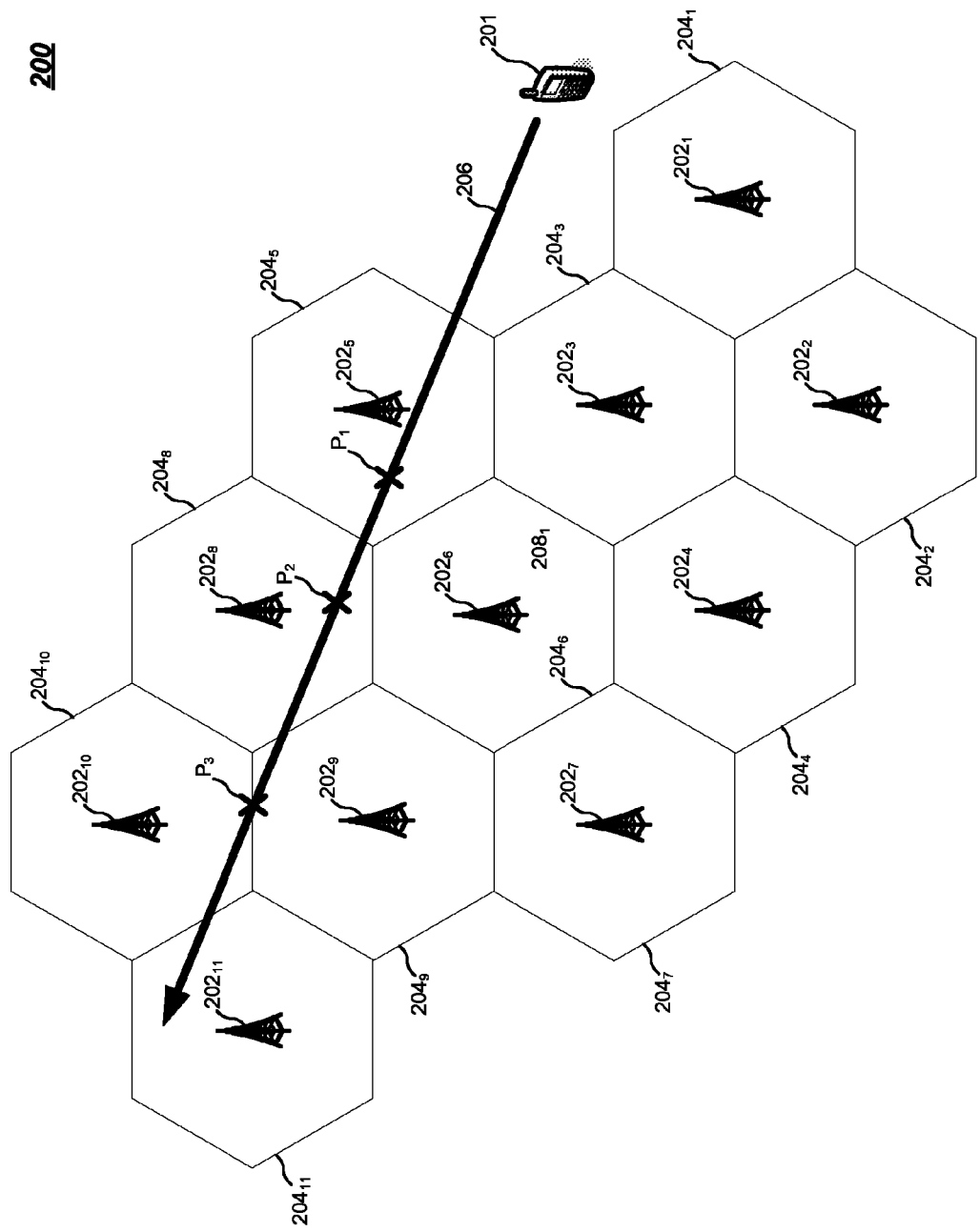
FIGS. 2A and 2B are diagrams illustrating exemplary operational scenarios.

As described above, apparatus 100 may engage in cellular communications. FIG. 2A is a diagram of a scenario 200 involving such communications. In particular, FIG. 2A shows a cellular network having multiple base stations 202. Together, these base stations may present a mobile device 201 with the ability to communicate across a region. Mobile device 201 may be implemented in various ways. In embodiments, for example, mobile device 201 may be implemented as described above with reference to FIGS. 1A-1C.

As shown in FIG. 2A, each base station 202 provides one or more cells 204. The shape and size of each cell 204 is referred to as the cell's coverage pattern. Within each coverage pattern, the corresponding cell may support communications with a mobile device, such as mobile device 201. FIG. 2A depicts these patterns as hexagons. However, this shape is idealized. In fact, cells 204 may have coverage patterns of irregular shapes that can change according to time-varying propagation environments. For instance, significant fluctuations may occur in the strength of signals received from base stations. Such fluctuations may occur even when mobile device 201 is stationary.

During a communications session (e.g., a telephony call), mobile device 201 may establish links with one or more of base stations 202. For instance, mobile device 201 may exchange links from one cell to another through handoff operations.

FIG. 2A shows mobile device 201 moving along a path 206. This path includes positions $P_1$, $P_2$, and $P_3$. At a position $P_1$, mobile device 201 is within cell $204_5$. Thus, mobile device 201 communicates with cellular network 200 through this cell. However, at a position $P_2$, mobile device 201 is within cell $204_8$. Therefore, between locations $P_1$ and $P_2$, a handoff occurs to transfer the communications of mobile device 201 from cell $204_5$ to $204_8$.

FIG. 2A shows that position $P_3$ is at a boundary between cells $204_9$ and $204_{10}$. Therefore, at this location, mobile device 201 may communicate with cellular network 200 from either of these cells. As described above, actual coverage patterns may dynamically change. Therefore, which of cells $204_9$ and $204_{10}$ appears preferable to mobile device 201 may also change.

Thus, in such situations, mobile device 201 may handoff among two or more cells on a frequent basis. Such frequent handoffs are referred to as "churning" or "ping pong" behavior. This condition may be undesirable. For instance, it may increase a mobile device's power consumption. In particular, it may increase the number of messages (e.g., handoff requests) transmitted by mobile device 201 to its current base station 204. Such increased power consumption can shorten the battery lifetime of mobile device 201.

Also, ping pong behavior may consume communications resources. For example, some networks may employ handoff procedures in which an old link and a new link are both maintained for an overlapping time interval.

Figure 2B:
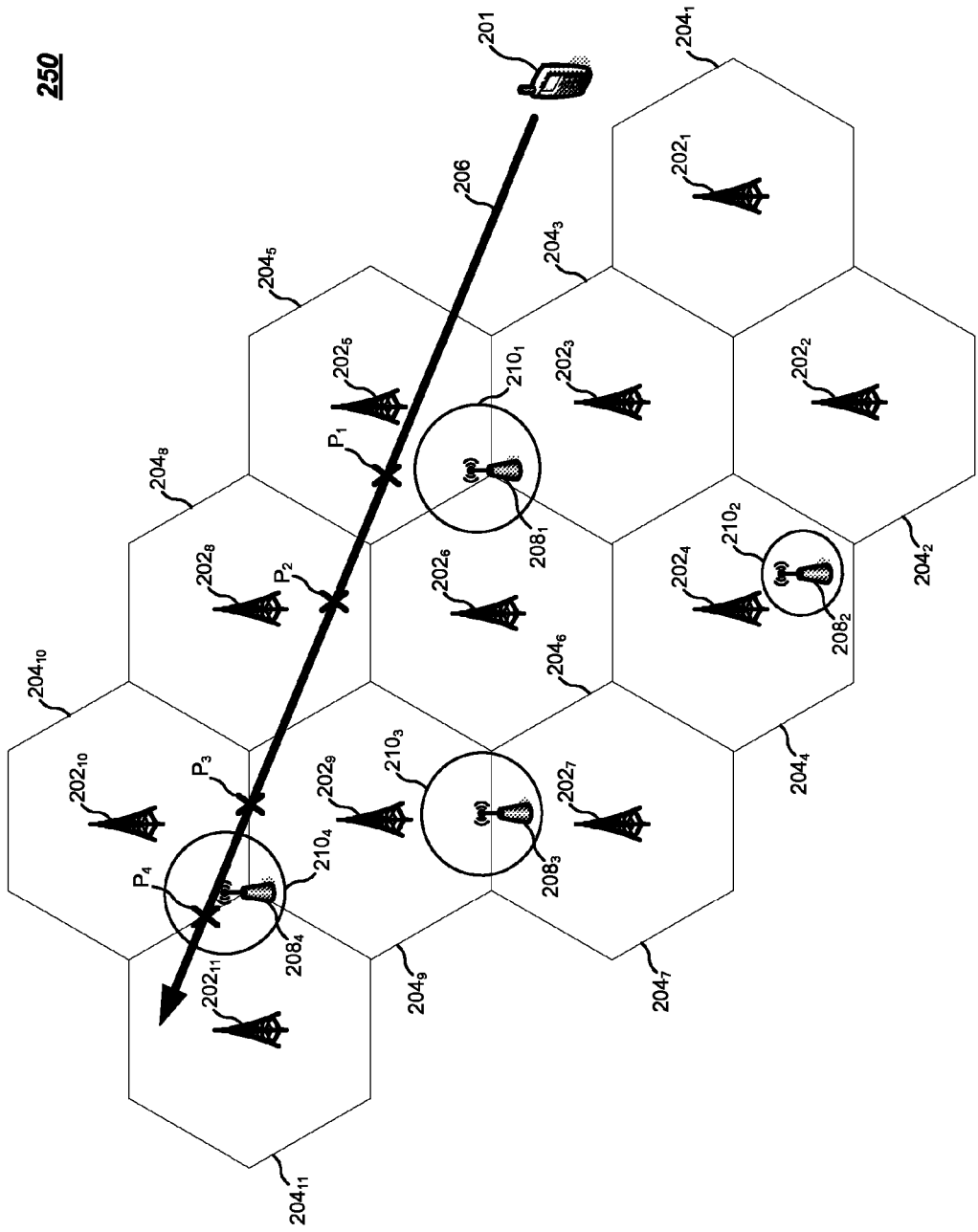

FIG. 2B is a diagram of a scenario 250 involving mobile device 201 engaging in communications over different types of links. This diagram is similar to FIG. 2A. However, in addition to including cellular network 200, FIG. 2B further includes multiple access points 208. During its movement along path 206, mobile device 201 may establish links and communicate with these access points. These links may be of various types, such as WiFi, WiMax, and/or Bluetooth links.

WiFi refers to wireless local area network (WLAN) technology specified by the IEEE 802.11 family of standards. In WiFi networks, devices may obtain media access through contention-based techniques. WiFi devices may transmit wireless signals in a frequency band near 2.4 GHz. Such signals may be transmitted according to various techniques, such as single carrier direct-sequence spread spectrum (DSS), and multiple carrier orthogonal frequency division multiplexing (OFDM).

WiMAX describes wireless networks implemented according to the IEEE 802.16 standards. Such networks may provide communications for devices that extend over a range of several miles. Also, WiMax networks may achieve data rates for devices on the order of 70 mega bits per second (Mbps). For signal transmissions, WiMax networks may employ orthogonal frequency division multiplexing (OFDM). Unlike WiFi networks, which employ contention-based media access techniques, WiMax networks may grant media access according to a scheduling algorithms. Such scheduling algorithms assign time slots to devices. These time slots may be allocated according to communications requirements of the devices.

Bluetooth networks are short-range wireless networks of up to eight devices that can be created in an ad hoc manner. In these networks, one device is referred to as a master device while the other devices are referred to as slave devices. The slave devices can communicate with the master device and with each other via the master device. Bluetooth devices are designed to find other Bluetooth devices within their communications range and to discover what services they offer.

For purposes of illustration, access points 208 will be described in the context of WiFi. However, access points may provide other types of communications. Referring again to FIG. 2B, access points 208 provide corresponding communications areas 210, which may have varying sizes and shapes. Exemplary sizes may vary from a few meters to multiple kilometers in radius.

During operation, each access point 208 may repeatedly broadcast an identifier, such as a service set identifier (SSID), in packets called beacons. Beacons may be transmitted at periodic intervals, such as every 100 milliseconds. Based on information conveyed in a beacon (e.g., SSID), mobile device 201 may decide whether to connect to the corresponding access point 208. If so, then mobile device 201 establishes a link with the access point.

Once a link is established between mobile device 201 and an access point 208, the access point 208 may provide mobile device 201 with connectivity to various wired resources (e.g., a wired local area network (LAN), a digital subscriber line (DSL), a cable network, the Internet, and so forth). In addition, the access point 208 may provide connectivity to other mobile devices through their corresponding wireless links with the access point.

Wireless signal characteristics may be more stable in WiFi networks than in cellular networks. This is because WiFi networks typically provide smaller coverage areas. Therefore, when mobile device 201 is stationary, it is typical for signals received from an access point 208 to be relatively constant in strength. Embodiments may employ such characteristics to assist handoff operations for other links. This feature may advantageously reduce ping pong behavior and device power consumption, as well as increase network capacity.

Referring again to FIG. 2B, path 206 is shown to further include a position $P_4$. At this position, mobile device 201 has a cellular link with base station $202_{10}$. In addition, mobile device 201 has a wireless link with access point $208_4$.

Moreover, FIG. 2B shows that position $P_4$ is at a boundary between cells $204_{10}$ and $204_{11}$. Thus, with respect to its cellular activities, mobile device 201 (while it remains near this location) is prone to ping pong between these two cells. However, according to embodiments, mobile device 201 may determine that it is relatively stationary. This determination may be based on energy or power characteristics of its link with access point $208_4$. Upon making this determination, mobile device 201 may set its handoff operations to reduce the occurrence of ping pong behavior.

IV Handoffs

As described above, devices, such as apparatus 100, may perform handoff operations. These operations may be performed to maintain a wireless session, such as a cellular telephone call. Depending on the wireless technology, various types of handoffs may be employed. Examples of such handoff types include "hard handoffs" and "soft handoffs".

Hard handoffs may be performed, for example, in time division multiple access (TDMA) and analog systems. During a hard handoff, a mobile device breaks its current host cell connection and subsequently establishes a connection with a neighboring cell. This connection with the neighboring cell becomes the current host cell connection.

Soft handoffs may be performed, for example, in networks employing CDMA technology. A soft handoff involves adding a neighbor cell connection to the current host cell connection. Once the neighbor cell connection is added, the preexisting host cell connection may be dropped. At this point, the added connection may become the new current host cell connection. However, connections with multiple cells may also be maintained to provide path diversity.

In addition to performing handoffs when a communications session (e.g., a telephony call) is active, a mobile device may perform handoffs at other times. This allows the mobile device to remain attached to a network while it is moving. For example, handoffs may occur when the device is in an idle state. Such handoffs are referred to as idle handoffs.

During idle state operation, a mobile device may receive various messages from base stations. These messages include signaling and overhead information. In certain systems (e.g., some CDMA systems), these messages may be transmitted over a paging channel. Such idle states may allow mobile devices to operate in a slotted mode that saves battery energy. However, this energy saving can be interrupted when the mobile device decides to perform an idle handoff. Therefore, ping pong behavior may also be undesirable in the context of idle handoffs.

An exemplary handoff operation involves a mobile device monitoring signal strengths of transmissions (e.g., CDMA pilot signals, TDMA burst transmissions, etc.) received from multiple base stations. For instance, a device may monitor the strength of its current base station as well as the strengths of neighboring base stations.

A mobile device's handoff operations may be based on various parameters, such as a neighbor signal level threshold. For instance, when a signal strength of a neighbor exceeds an established signal level threshold (e.g., 3 decibels), the mobile device may perform a handoff to the neighbor. In addition, other parameters (such as time thresholds) may be employed.

Certain systems, such as TDMA and analog systems, may assign different frequencies to neighboring cells. Thus, evaluation of multiple candidate cells may require tuning among multiple frequencies.

However, in certain CDMA technologies (e.g., IS-95 and CDMA 2000), a set of neighboring cells may use a pseudo-random noise sequence ("PN sequence") to spread transmitted signals across a shared frequency range. Despite sharing a frequency range, cells (or base stations) are distinguished through delays from the beginning of the PN sequence. Such delays are called PN offsets. Thus, according to such transmission techniques, base station signals may be received and monitored through processing that does not require tuning among multiple frequencies.

V. Exemplary Implementation

Figure 3:
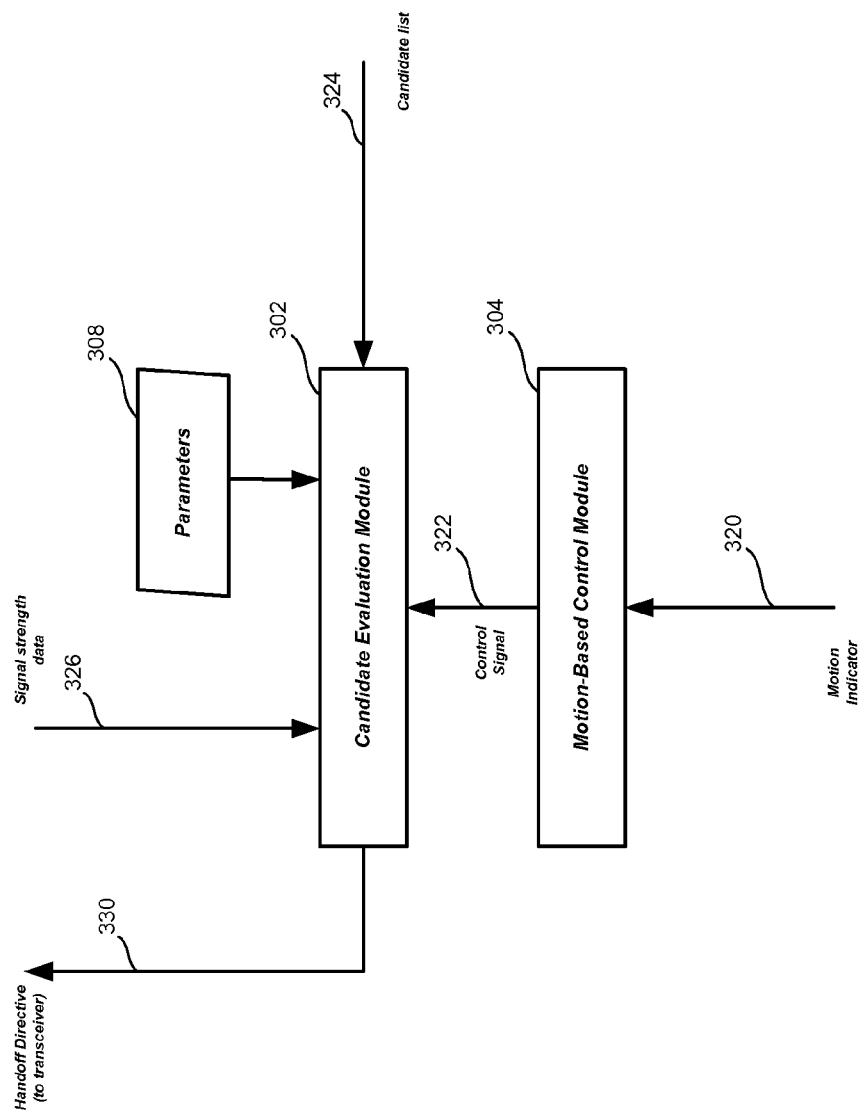
FIG. 3 illustrates an exemplary implementation embodiment that may be included within a handoff controller.

FIG. 3 is a diagram of an exemplary implementation that may perform handoff operations, such as the ones described above. In particular, FIG. 3 shows an exemplary implementation embodiment 300 that may be included within handoff controller 122. This implementation may comprise various elements. The embodiments, however, are not limited to these elements. For instance, embodiments may include other combinations elements, as well as other couplings between elements. In particular, FIG. 3 shows that implementation 300 may include a candidate evaluation module 302 and a motion-based control module 304.

Candidate evaluation module 302 monitors and evaluates one or more candidates for potential handoffs. These candidate(s) may include one or more neighbor cells, as well as the current host cell. As shown in FIG. 3, candidate evaluation module 302 receives a candidate list 324, which identifies the one or more candidates. Accordingly, this list may provide one or more identification characteristics (e.g., frequency, timing, PN offset data, and/or cell identifiers) for each candidate cell. In embodiments, candidate list 324 may be received from a controller, such as communications controller 120. Thus, with reference to FIGS. 1A-1C, candidate list 324 may be implemented as neighbor list 156.

Candidate evaluation module 302 may monitor and evaluate cells. This evaluation may be based on received signal strength data 326. This data may be received in response to a measurement directive 325 generated by candidate evaluation module 302. With reference to FIGS. 1A-1C, signal strength data 326 and measurement directive 325 may be implemented as neighbor data 160 and reception parameters 164, respectively.

Signal strength data 326 provides strength information for transmissions received from candidates identified in candidate list 324. Such information may include measurements of energy, power, signal-to-interference ratios, and/or signal-to-noise ratios. Data 326 and directive 325 may be exchanged with a transceiver (e.g., transceiver 118), either directly or through other elements (e.g., communications controller 120).

Candidate evaluation module 302 evaluates signal strength data 326 based on one or more evaluation parameters 308. Such evaluations may result in candidate evaluation module 302 generating a handoff directive 330. With reference to FIGS. 1A-1C, handoff directive 330 may be implemented as handoff directive 162. However, the evaluation of candidates and the issuance of handoff directives may be subject to constraints or limitations imposed by a control signal 322 received from control module 304.

Control module 304 generates control signal 322 based on a motion indicator 320. Motion indicator 320 indicates whether the associated device is substantially stationary or in motion. Also, motion indicator 320 may indicate the degree (e.g., velocity) of any such motion. Accordingly, motion indicator 320 may be motion characteristic 158 of FIGS. 1A-1C.

When motion indicator 320 indicates a degree of motion above a predetermined threshold, then control module 304 may generate a control signal 322 that directs candidate evaluation module 302 to perform its normal evaluation and monitoring operations. Such operations may include the aforementioned techniques. For example, one technique involves initiating a handoff when a neighbor's signal strength exceeds a signal level threshold (e.g., 3 decibels). Also, such techniques may involve further parameters, such as time thresholds.

In contrast, when motion indicator 320 indicates a stationary or low motion condition, then control module 304 may set control signal 322 to specify alternate handoff operations. Such alternate handoff operations may involve halting the evaluation of candidates and the issuance of handoff directives by candidate evaluation module 302.

In embodiments, handoff operations may be halted due to a stationary or low motion condition only during idle motion operation. This may advantageously increase idle mode energy savings.

In further embodiments, such alternate handoff operations may involve the continued evaluation of candidates with modified parameters (e.g., neighbor signal level thresholds). In further embodiments, handoff operations may be established for multiple degrees of motion (e.g., multiple velocity ranges). In such embodiments, motion indicator 320 may take on values for each of these degrees of motion.

VI. Operation

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
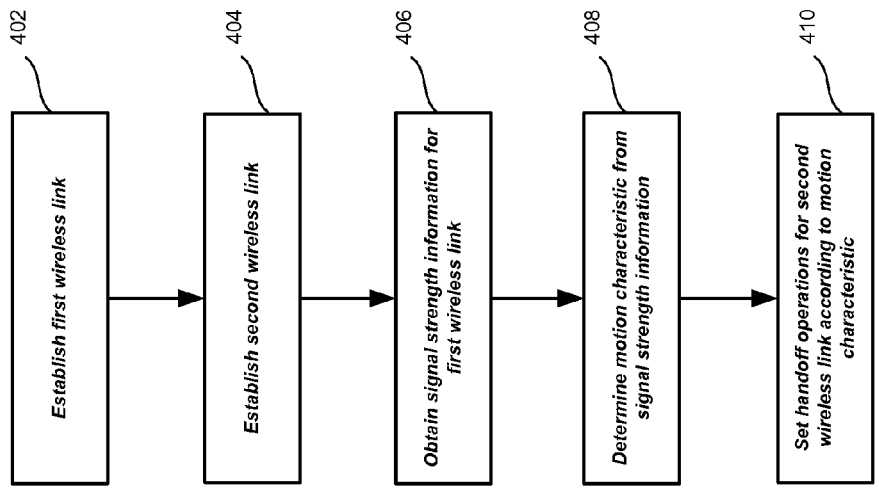
FIG. 4 illustrates an exemplary logic diagram.

FIG. 4 illustrates one embodiment of a logic flow. In particular, FIG. 4 illustrates a logic flow 400, which may be representative of the operations executed by one or more embodiments described herein. As shown in logic flow 400, a block 402 establishes a first wireless link. Also, a block 404 establishes a second wireless link. In embodiments, the first wireless link may be a data networking link, while the second wireless link may be a cellular link. Alternatively, the first wireless link may be a cellular link, while the second wireless link may be a data networking link. However, the embodiments are not limited to such examples.

A block 406 obtains signal strength information for the first wireless link. From this signal strength information, a block 408 determines a motion characteristic.

A block 410 sets handoff operations for the second wireless link according to the motion characteristic. This setting may comprise various acts. For instance, handoff operations (e.g., evaluating candidates, and/or issuing handoff requests or directives) may be ceased when the motion characteristic identifies a substantially stationary condition. Alternatively or additionally, such operations may be modified. For instance, one or more handoff parameters (e.g., employed thresholds, and time intervals) may be modified in accordance with the motion characteristic.

VII. Further Techniques

Figure 5:
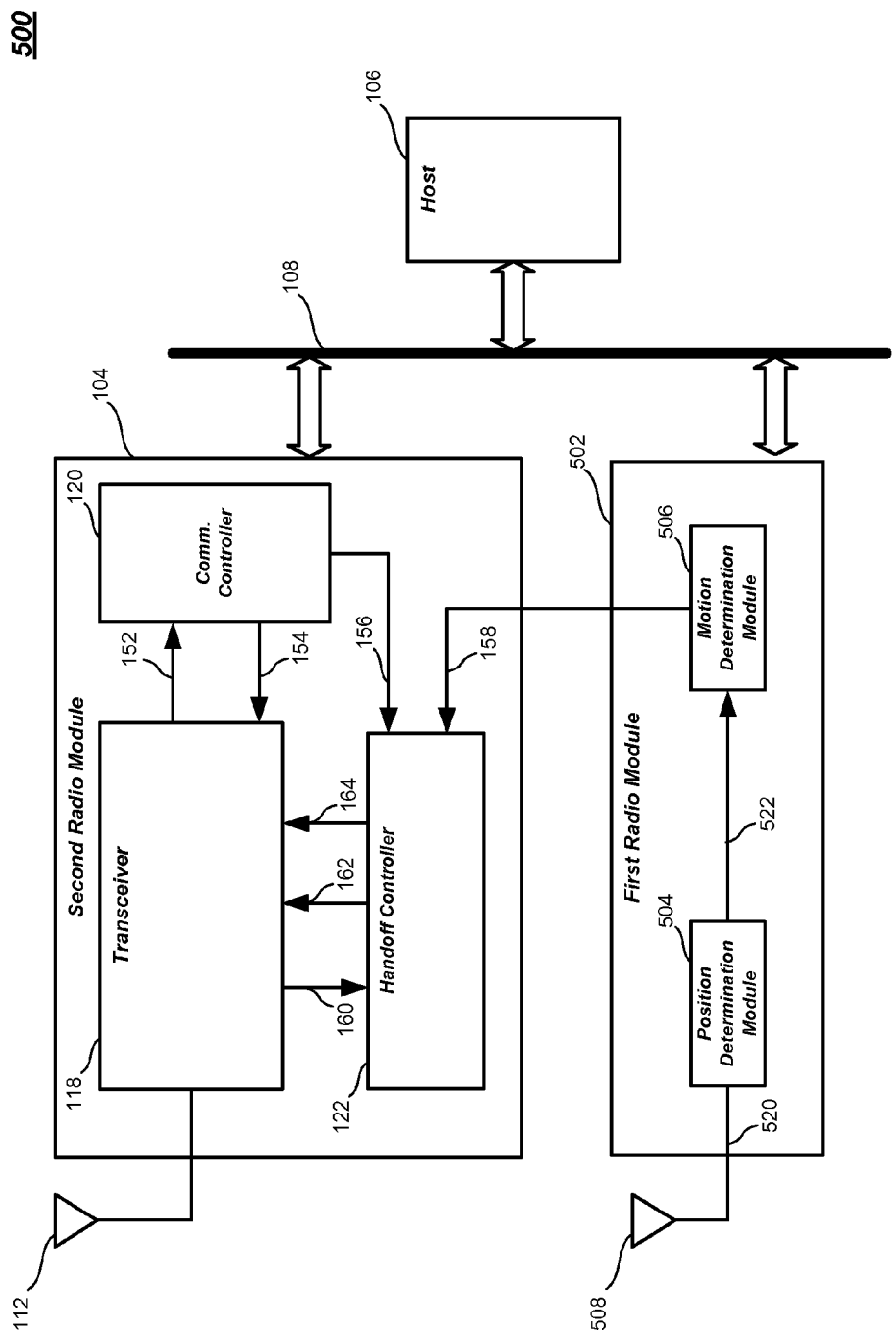
FIG. 5 illustrates a further embodiment of an apparatus.

Embodiments may employ further techniques for discerning motion. For example, FIG. 5 provides an example that employs location determination techniques. In particular, FIG. 5 is a diagram of an apparatus 500, which is similar to the diagrams of FIGS. 1A-1C. However instead of having first radio module 102, apparatus 500 is shown including a first radio module 502. As shown in FIG. 5, first radio module 502 may include a position determination module 504 and a motion determination module 506. These elements may be implemented in hardware, software, firmware, or any combination thereof.

Position determination module 504 may determine the location of apparatus 500 from wireless signals 520 that are received through an antenna 508. Such signals may include timing signals from multiple global positioning system (GPS) satellites. Accordingly, position determination module 504 may be included in a GPS receiver that receives the time signals. From these time signals, position determination module 504 may generate position indicators 522 through a trilateration computational technique. These position indicators may be in the form of coordinates (e.g., latitude, longitude, and altitude).

As shown in FIG. 5, position indicators 522 are sent to motion determination module 506. From these indicators, motion determination module 506 determines a displacement with respect to time (e.g., velocity) for apparatus 500. This displacement may be calculated as a difference between two position coordinates. Based on this determination, motion determination module 506 generates a motion indicator 158, which is sent to handoff controller 122. Handoff controller 122 may employ motion indicator 158 to perform motion-based handoff operations, as described herein.

Figure 6:
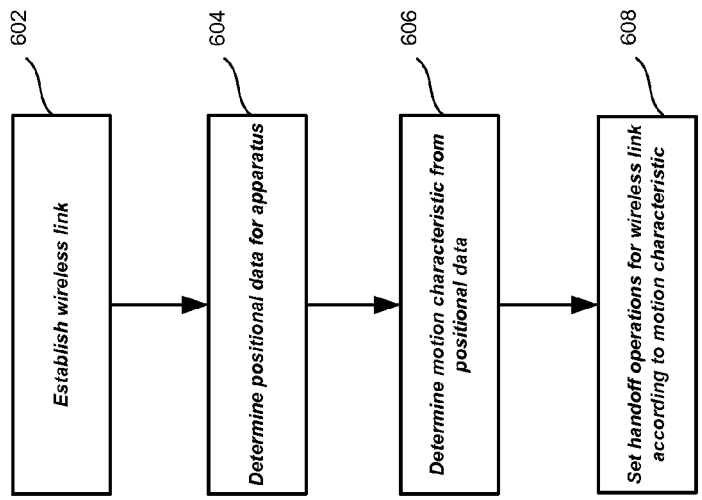
FIG. 6 illustrates a further exemplary logic diagram.

FIG. 6 illustrates a logic flow 600, which may be representative of the operations executed by an apparatus, such as by apparatus 500 as well as by further embodiments. As shown in logic flow 600, a block 602 establishes a wireless link for the apparatus. This wireless link may be of various types, such as a data networking link, a cellular link, and so forth.

A block 604 determines positional data for the apparatus. This information may be determined from received GPS signals. However, the embodiments are not limited to such. The positional data may include coordinates (e.g., latitude, longitude, and altitude) for the apparatus at one or more moments in time.

As shown in FIG. 6, a block 606 determines a motion characteristic from the positional data. This may involve computing a displacement of the apparatus with respect to time. Computing the displacement may include calculating a difference between two position coordinates determined by block 604. Each of these position coordinates may correspond to a particular moment in time.

A block 608 sets handoff operations for the wireless link according to the motion characteristic. This setting may comprise various acts. For instance, handoff operations (e.g., evaluating candidates, and/or issuing handoff requests or directives) may be ceased when the motion characteristic identifies a substantially stationary condition. Alternatively or additionally, such operations may be modified. For instance, one or more handoff parameters (e.g., employed thresholds, and time intervals) may be modified in accordance with the motion characteristic.

VIII. Data Networking Handoffs

Exemplary apparatus embodiments have been described that have a first radio module 102 and a second radio module 104. In these illustrative embodiments, second radio module 104 engages in handoff operations. Such handoff operations may be assisted by motion information.

As described above, handoff operations may be associated with wireless cellular communications. However, handoff operations may be further associated with data networking operations. For instance, second radio module 104 may engage in wireless data networking activities across links, such as WLAN links, WIMAX links, PAN links, and so forth. Such activities may involve handoff operations. For instance, data networking associated handoffs may occur as an apparatus moves among multiple access point coverage areas.

With reference to FIGS. 1A-1C, and 5, these data networking handoff operations may involve handoff controller 122. Further, these handoff operations may be based on motion characteristics. For example, such operations may be in accordance with the logic flows of FIGS. 4 and 6.

IX. System

Figure 7:
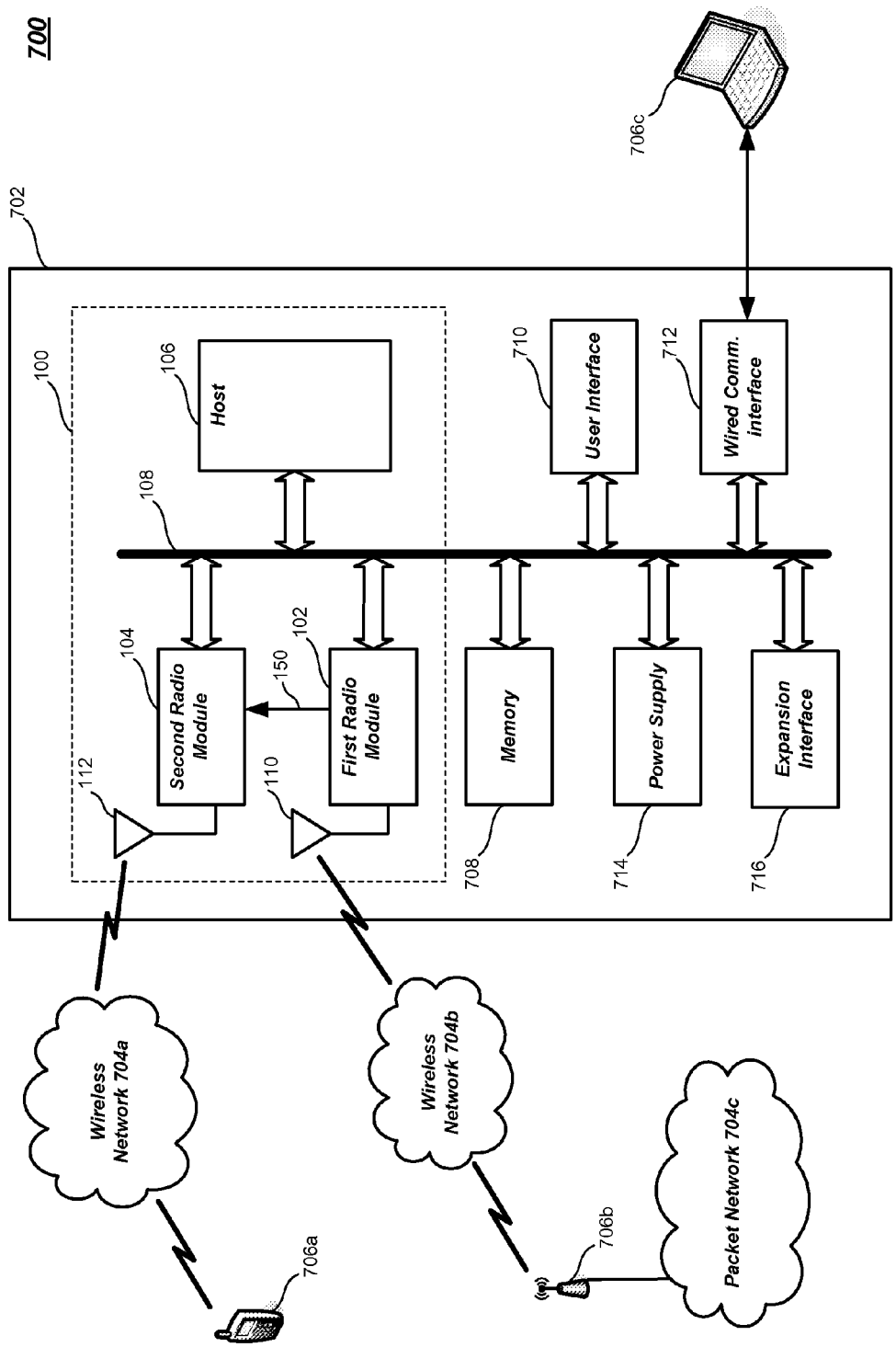
FIG. 7 illustrates one embodiment of a system.

FIG. 7 illustrates an embodiment of a system 700. This system may be suitable for use with one or more embodiments described herein, such as apparatus 100, implementation 300, logic flow 400, and so forth. Accordingly, system 700 may engage in wireless communications across various link types, such as the ones described herein. In addition, system 700 may perform various user applications.

As shown in FIG. 7, system 700 may include a device 702, multiple communications networks 704, and one or more remote devices 706. FIG. 7 shows that device 702 may include the elements of FIGS. 1A-1C. In addition, device 702 may include a memory 708, a user interface 710, a wired communications interface 712, a power supply 714, and an expansion interface 716.

Memory 708 may store information in the form of data. For instance, memory 708 may contain, application documents, e-mails, sound files, and/or images in either encoded or unencoded formats. Alternatively or additionally, memory 708 may store control logic, instructions, and/or software components. These software components include instructions that can be executed by one or more processors. Such instructions may provide functionality of one or more elements in system 700. Exemplary elements include host 106, one or more components within radio modules 102 and 104, user interface 710, and/or communications interface 712.

Memory 708 may be implemented using any machine-readable or computer-readable media capable of storing data, including both volatile and non-volatile memory. For example, memory 708 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 708 may be included in other elements of system 700. For instance, some or all of memory 708 may be included on a same integrated circuit or chip with as image processing module 106. Alternatively some portion or all of memory 708 may be disposed on an integrated circuit or other medium, for example a hard disk drive, which is external. The embodiments are not limited in this context.

User interface 710 facilitates user interaction with device 702. This interaction may involve the input of information from a user and/or the output of information to a user. Accordingly, user interface 710 may include one or more devices, such as a keypad, a touch screen, a microphone, and/or an audio speaker. In addition, user interface 710 may include a display to output information and/or render images/video processed by device 702. Exemplary displays include liquid crystal displays (LCDs), plasma displays, and video displays.

Wired communications interface 712 provides for the exchange of information with a device 706c (e.g., a proximate device), such as a personal computer. This exchange of information may be across one or more wired connections. Examples of such connections include USB interfaces, parallel interfaces, and/or serial interfaces. In addition, interface 712 may provide for such exchanges across wireless connections(s). An infrared interface is an example of such a connection. The information exchanged with such proximate devices, may include e-mail, calendar entries, contact information, as well as other information associated with personal information management applications. In addition, such information may include various application files, and content (e.g., audio, image, and/or video).

Wired communications interface 712 may include various components, such as a transceiver and control logic to perform operations according to one or more communications protocols. In addition, communications interface 712 may include input/output (I/O) adapters, physical connectors to connect the I/O adapter with a corresponding communications medium.

FIG. 7 shows that device 702 may communicate across wireless networks 704a and 704b. In particular, FIG. 7 shows communications across network 704a being handled by second radio module 104, and communications across network 704b being handled by first radio module 102. Accordingly, first wireless network 704a may be a cellular network, while second wireless network 704b may be a wireless data network. However, the embodiments are not limited to these examples.

Such wireless communications allow device 702 to communicate with various remote devices. For instance, FIG. 7 shows device 702 engaging in wireless communications (e.g., telephony or messaging) with a mobile device 706a. In addition, FIG. 7 shows device engaging in wireless communications (e.g., WLAN, WMAN, and/or PAN communications) with an access point 706b. In turn access point 706b may provide device 702 with access to further communications resources. For example, FIG. 7 shows access point 706b providing access to a packet network 704c, such as the Internet.

Power supply 714 provides operational power to elements of device 702. Accordingly, power supply 714 may include an interface to an external power source, such as an alternating current (AC) source. Additionally or alternatively, power supply 714 may include a battery. Such a battery may be removable and/or rechargeable. However, the embodiments are not limited to these examples.

Expansion interface 716 may be in the form of an expansion slot, such as a secure digital (SD) slot. Accordingly, expansion interface 716 may accept memory, external radios (e.g., global positioning system (GPS), Bluetooth, WiFi radios, etc.), content, hard drives, and so forth. The embodiments, however, are not limited to SD slots. Other expansion interface or slot technology may include memory stick, compact flash (CF), as well as others.

X. Conclusion

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of managing intra-RAT (radio access technology) handoff operations on a wireless network between a first base station of a first RAT type and a second base station of the first RAT type based on a wireless signal received from an access point of a second RAT type, comprising:
    establishing, at a mobile device, communication with the first base station of the first RAT type;
    receiving, at the mobile device, the wireless signal from the access point of the second RAT type while maintaining the established communication with the first base station of the first RAT type;
    determining, based on signal strength information associated with the wireless signal received from the access point of the second RAT type, a motion characteristic of the mobile device; and adapting intra-RAT handoff operations of the mobile device between the first base station of the first RAT type and the second base station of the first RAT type based on the determined motion characteristic of the mobile device, wherein the intra-RAT handoff operations comprise:
  terminating the established communication with the first base station of the first RAT type; and
  establishing communication with the second base station of the first RAT type.

2. The method of claim 1, wherein the first RAT type is a cellular type and the second RAT type is a data networking type.

3. The method of claim 2, wherein the data networking type is one of a wireless local area network type, a wireless metropolitan area type, and a Bluetooth type.

4. The method of claim 1, wherein the adapting intra-RAT handoff operations of the mobile device comprises comparing the determined motion characteristic of the mobile device to a predetermined threshold.

5. The method of claim 4, wherein the adapting intra-RAT handoff operations of the mobile device comprises halting the intra-RAT handoff operations of the mobile device between the first base station of the first RAT type and the second base station of the first RAT type when the determined motion characteristic of the mobile device does not exceed the predetermined threshold.

6. The method of claim 1, wherein the adapting intra-RAT handoff operations of the mobile device is further based on a signal strength of the second base station.

7. An apparatus for managing intra-RAT (radio access technology) handoff operations on a wireless network between a first base station of a first RAT type and a second base station of the first RAT type based on a wireless signal received from an access point of a second RAT type, comprising:
  means for establishing communication with the first base station of the first RAT type;
  means for receiving the wireless signal from the access point of the second RAT type while maintaining the established communication with the first base station of the first RAT type;
  means for determining, based on signal strength information associated with the wireless signal received from the access point of the second RAT type, a motion characteristic of a mobile device; and
  means for adapting intra-RAT handoff operations of the mobile device between the first base station of the first RAT type and the second base station of the first RAT type based on the determined motion characteristic of the mobile device, wherein the intra-RAT handoff operations comprise:
    means for terminating the established communication with the first base station of the first RAT type; and
    means for establishing communication with the second base station of the first RAT type.

8. The apparatus of claim 7, wherein the first RAT type is a cellular type and the second RAT type is a data networking type.

9. The apparatus of claim 8, wherein the data networking type is one of a wireless local area network type, a wireless metropolitan area type, and a Bluetooth type.

10. The apparatus of claim 7, wherein the means for adapting intra-RAT handoff operations of the mobile device comprise means for comparing the determined motion characteristic of the mobile device to a predetermined threshold.

11. The apparatus of claim 1, wherein the means for adapting intra-RAT handoff operations of the mobile device comprise means for halting the intra-RAT handoff operations of the mobile device between the first base station of the first RAT type and the second base station of the first RAT type when the determined motion characteristic of the mobile device does not exceed the predetermined threshold.

12. The apparatus of claim 7, wherein the means for adapting intra-RAT handoff operations of the mobile device is further based on a signal strength of the second base station.

13. An apparatus for managing intra-RAT (radio access technology) handoff operations on a wireless network between a first base station of a first RAT type and a second base station of the first RAT type based on a wireless signal received from an access point of a second RAT type, comprising:
  at least one processor; and
  a memory coupled to the at least one processor, wherein the at least one processor is configured to:
    establish communication with the first base station of the first RAT type;
    receive the wireless signal from the access point of the second RAT type while maintaining the established communication with the first base station of the first RAT type;
    determine, based on signal strength information associated with the wireless signal received from the access point of the second RAT type, a motion characteristic of a mobile device; and
    adapt intra-RAT handoff operations of the mobile device between the first base station of the first RAT type and the second base station of the first RAT type based on the determined motion characteristic of the mobile device, wherein the intra-RAT handoff operations comprise:
      terminating the established communication with the first base station of the first RAT type; and
      establishing communication with the second base station is a link of the first RAT type.

14. The apparatus of claim 13, wherein the first RAT type is a cellular type and the second RAT type is a data networking type.

15. The apparatus of claim 14, wherein the data networking type is one of a wireless local area network type, a wireless metropolitan area type, and a Bluetooth type.

16. The apparatus of claim 13, wherein the at least one processor being configured to adapt intra-RAT handoff operations of the mobile device comprises the at least one processor being further configured to compare the determined motion characteristic of the mobile device to a predetermined threshold.

17. The apparatus of claim 16, wherein the at least one processor being configured to adapt intra-RAT handoff operations of the mobile device comprises configuration of the at least one processor to halt the intra-RAT handoff operations of the mobile device between the first base station of the first RAT type and the second base station of the first RAT type when the determined motion characteristic of the mobile device does not exceed the predetermined threshold.

18. The apparatus of claim 13, wherein adapting intra-RAT handoff operations of the mobile device is further based on a signal strength of the second base station.

19. A computer program product for managing intra-RAT (radio access technology) handoff operations on a wireless network between a first base station of a first RAT type and a second base station of the first RAT type based on a wireless signal received from an access point of a second RAT type, comprising:
- a non-transitory computer-readable storage medium having program code stored thereon, the program code including program code to:
  - establish communication the first base station of the first RAT type;
  - receive the wireless signal from the access point of the second RAT type while maintaining the established communication with the first base station of the first RAT type;
  - determine, based on signal strength information associated with the wireless signal received from the access point of the second RAT type, a motion characteristic of a mobile device; and
  - adapt intra-RAT handoff operations of the mobile device between the first base station of the first RAT type and the second base station of the first RAT type based on the determined motion characteristic of the mobile device, wherein the intra-RAT handoff operations comprise:
    - terminating the established communication with the first base station of the first RAT type; and
    - establishing communication with the second base station of the first RAT type.

20. The computer program product of claim 19, wherein the first RAT type is a cellular type and the second RAT type is a data networking type.

21. The computer program product of claim 20, wherein the data networking type is one of a wireless local area network type, a wireless metropolitan area type, and a Bluetooth type.

22. The computer program product of claim 19, wherein the program code to adapt intra-RAT handoff operations of the mobile device comprises program code to compare the determined motion characteristic of the mobile device to a predetermined threshold.

23. The computer program product of claim 22, wherein the program code to adapt intra-RAT handoff operations of the mobile device comprises program code to halt the intra-RAT handoff operations of the mobile device between the first base station of the first RAT type and the second base station of the first RAT type when the motion characteristics of the mobile device does not exceed the predetermined threshold.

24. The computer program product of claim 19, wherein adapting intra-RAT handoff operations of the mobile device is further based on a signal strength of the second base station.

\* \* \* \* \*